United States Patent
Memoli et al.

(10) Patent No.: US 7,854,785 B2
(45) Date of Patent: Dec. 21, 2010

(54) METHOD AND APPARATUS FOR THE RECOVERY OF THE SECONDARY METALLURGY (LF) SLAG AND ITS RECYCLING IN THE STEEL PRODUCTION PROCESS BY MEANS OF ELECTRIC FURNACE

(75) Inventors: Francesco Memoli, Milan (IT); Osvaldo Brioni, Brescia (IT); Mauro Bianchi Ferri, Milan (IT)

(73) Assignee: Techint Compagnia Tecnica Internazionale S.p.A., Milan (IT)

( * ) Notice: Subject to any disclaimer, the term of this patent is extended or adjusted under 35 U.S.C. 154(b) by 228 days.

(21) Appl. No.: 11/887,339

(22) PCT Filed: Mar. 28, 2006

(86) PCT No.: PCT/EP2006/003239
§ 371 (c)(1),
(2), (4) Date: Feb. 21, 2008

(87) PCT Pub. No.: WO2006/103114
PCT Pub. Date: Oct. 5, 2006

(65) Prior Publication Data
US 2009/0049955 A1 Feb. 26, 2009

(30) Foreign Application Priority Data
Apr. 1, 2005 (IT) .......................... MI2005A0538

(51) Int. Cl.
*C22B 7/04* (2006.01)
*C21B 13/00* (2006.01)
*B22F 9/04* (2006.01)
(52) U.S. Cl. ............................. 75/335; 75/338; 75/339; 75/10.46; 75/582; 264/9; 264/12

(58) Field of Classification Search ................ 75/10.46, 75/582, 335, 339, 338; 264/9, 12
See application file for complete search history.

(56) References Cited

U.S. PATENT DOCUMENTS 5,820,814 A * 10/1998 Doumet ........................ 266/44

FOREIGN PATENT DOCUMENTS

| DE | 3626772 A1 | 2/1988 |
| JP | 52030290 A | 3/1977 |
| JP | 53071696 A | * 6/1978 |
| JP | 05117736 A | * 5/1993 |
| WO | WO 0238816 | 5/2002 |

OTHER PUBLICATIONS

Machine translation of JP 52-030290 published Mar. 1977.*
International Search Report, Nov. 13, 2006.

* cited by examiner

*Primary Examiner*—George Wyszomierski
*Assistant Examiner*—Tima M McGuthry-Banks
(74) *Attorney, Agent, or Firm*—Hedman & Costigan, P.C.; James V. Costigan

(57) ABSTRACT

A Method for the recovery of the secondary metallurgy (LF) slag from a plant for the production of steel, the method comprising a cooling step of the slag, by means of the passage of air and/or other gas, a breakdown step, a step of extracting the powder, wherein the breakdown step is accelerated by means of forced convection of a cooling fluid and/or another reaction, gas and by means of moving the slag mass by over-turning and vibrating support gratings. The overturning and vibrating support gratings are provided inside closed metallic boxes which are connected in series and closed with movable containment partitions to form a treatment module. The breakdown, step is accelerated by means of overturning the slag mass from the support grating of one metallic box to the support grating of an adjoining box.

12 Claims, 4 Drawing Sheets

METHOD AND APPARATUS FOR THE RECOVERY OF THE SECONDARY METALLURGY (LF) SLAG AND ITS RECYCLING IN THE STEEL PRODUCTION PROCESS BY MEANS OF ELECTRIC FURNACE

The present invention refers to a method and apparatus for the recovery of the slag of secondary metallurgy (especially from ladle treatment—LF) and its recycling in the steel production process by means of electric arc furnace (EAF).

The problems connected with respect for the environment are increasingly a critical issue in the validity and profitability of an industrial process, and this is especially true in a field with high energy consumption and high consumption of raw materials such as that of iron metallurgy production. Many attempts have been made to recover products which may be commercialized (for example, Zn and inert particulate for asphalt) or which may be reintroduced into the steel production cycle (silicates, iron oxides and other metals) beginning with the slag or other process residues such as, for example, the fine particles generated in arc furnaces. In steelworks, such recycling actions are meant to lessen the cost of storage and disposal of materials, which sometimes have high environmental impact, while at the same time saving on the purchase of costly consumption materials. For the environment, such strategy translates into a reduction of the natural resources exploitation, and a strong limitation in the quantity of materials to be disposed in the dump.

That said above, it should be underlined, is mainly valid for the production steps which are conducted in EAFs. Relatively little attention has been dedicated to those "outside the furnace" secondary metallurgy steps (carried out, for example, in ladles) which are in any case necessary to obtain quality steels and which generate considerable quantities of slag to dispose of, not less than the EAF.

Most (about 90%) of the potentially recyclable refuse from secondary metallurgy, currently disposed of in dumps, is composed of ladle slag. There follows, in order of importance: the ladle and tundish refractory (each concurrent for about 3%), the furnace refractory (2.5%) and from fine residues deriving from the working or moving of these materials (about 2%).

The ladle slag is substantially formed by oxidised compounds of calcium (for examples calcium silicates and free lime). Moreover, there are present (in quantities which vary depending on the type of steel to be obtained): a small quantity of EAF slag (remaining from the tap operations), refractory wear products, bath oxidation products (for example silica and manganese oxide), compounds deriving from the oxidation of ferroalloys as well as the fluxes (for example lime, Bauxite, calcium fluoride) added during the process. In practice, the typical composition of such slag is about 60% calcium and magnesium oxides and about 20% silica and aluminium. Chemical analyses establish the composition which is maintained sufficiently constant during the various production cycles.

Only several methods are known which are suitable for the recovery and recycling of ladle slag. Through the so-called "hot recycling", for example, a semi-liquid mixture containing the slag and the steel, residues from a previously concluded ladle treatment, are poured directly into the EAF, before the scraps and process materials are allowed to enter. From the energy standpoint, this solution is particularly advantageous, since in addition to the material (the slag and the non-tapped liquid metal bottom), part of the previously used heat is also recycled in the ladle refining process.

Such method has several drawbacks, however, which make its use unadvisable. The most important of these drawbacks are: the increase in the power-off time of the furnace (with prolongation of the total cycle time), an operating risk for workers, since they must pour off relatively high quantities of very hot materials in a semi-melted phase, and the lack of repeatability and control in the composition of the EAF slag.

Another solution is based on the "cold" recycling of the materials contained in the slag.

During the ladle process, the main component of the lime composing the slag, the dicalcium silicate $2CaO.SiO_2$, is present in its a phase, stable at high temperatures. At the end of the cycle, the slag is extracted from the ladle and allowed to cool. During the cooling, at 630° C., a first phase transition occurs (passage from $\alpha$ to $\beta$), followed at around 500° C. by a second, exothermic transition, so to obtain a phase $\gamma$ which is stable at room temperature.

The conversion from phase $\beta$ to phase $\gamma$ is accompanied by the development of a different crystallographic phase and by an increase in volume, on the order of 10%. The volume increase leads to a fragmentation process of the matrix known as slag "breakdown". In practice, the lowering of the ladle slag temperature produces reusable lime powder.

An analogous process occurs by the hydration and carbonisation of the free MgO and CaO (i.e., not combined in silicates). Due to exposure to humidity and carbon dioxide, in fact, these compounds may give place to the formation of hydrates and carbonates, with double the volume with respect to their precursors. Analogously to that stated above, the tensions induced from such chemical transformations have the effect of shattering the solid matrix, producing a powder which may be reused in EAF, ladle or other applications.

Such hydration and carbonation reactions, however, are not normally desired, since the resulting compounds are very stable and hence require a high waste of energy for their reuse (for example, injecting them into an electric furnace). In addition, the hydrates have unpleasant odours, and their development requires additional confinement solutions to avoid their dispersion into the outside environment.

The exploitation of the natural process of ladle slag "breakdown" occurs by means of suitable gratings overlying powder recovery hoppers: power shovels accumulate the slag, still at high temperature, on the separation gratings. The natural cooling causes the various phase changes which leads to the fragmentation, separation and collection of the powder.

One example of such solution is described in the document EP 1337671; the recycling of the ladle slag is realised by allowing the slag to cool and, consequently, naturally "breakdown" in a storage bin. The walls of the hopper permit a minimum of air to pass through, which assists in the cooling.

The aforesaid method, nevertheless, has several drawbacks: since the ladle scrap is a material with low thermal conductivity, and the breakdown process is exothermic, the cooling of the slag surface is very fast but the transfer of heat from the core of the mass to the outside environment occurs in a very slow manner. In practice, there is a stabilisation of the temperature in the pile core at a temperature close to that of the phase transition. The accumulation of powder on the upper part of the pile, then, operates as an insulating blanket which reduces even more the thermal exchange with the outside environment. For practical reasons, in conventional procedure, the breakdown process is carried out over quite vast areas, and is concluded without having completely extracted the available $C_2S$.

General object of the present invention, therefore, is to resolve the above-cited drawbacks in a simple, economical and particularly functional manner.

Primary objective of the present invention, therefore, consists of the recovery of the slag coming from secondary metallurgy in ladles, supplementing it, in recycling (injecting it in an EAF or adding it as a slag former in any other "outside the furnace" process) with ground products coming from reconstructions and demolitions such as coating refractories of the ladle, tundish and/or electric arc furnace, as well fine powders coming from a dust suppression facility.

Particular object is to realise a method and apparatus for the recovery of secondary metallurgy (LF) slag, in particular ladle slag, capable of reducing the transformation times, and therefore producing a greater quantity of recovery powder using the smallest area of the plant.

In view of the aforesaid objects, object of the present invention is a method for the recovery of the secondary metallurgy (LF) slag from a steel production plant, such method comprising a cooling step of the secondary metallurgy (LF) slag by means of the passage of air and/or other gas, a breakdown step, i.e. transformation of several phases present in the mass into powder, and a drawing step of the powder.

A method for the recovery of the secondary metallurgy (LF) slag is hence object of the present invention, as defined in claims 1-12.

In particular, the cooling step of the slag is carried out until the $\beta \rightarrow \gamma$ transformation temperature is attained (sustained by a forced convection of air or another possible cooling gas), followed by the breakdown step, i.e. a step of forced transformation (sustained by a forced convection of air and/or possible other reaction gas—for example carbon dioxide—and/or cooling and mechanical moving of the slag mass) and then a step of drawing the slag in powder form (or as solid residues to be ground).

The method according to the invention may then foresee a possible step of mixing and compositional supplementation of the breakdown products with residues (for example powders and fines from demolition facilities), pure materials and other ground debris material (from reconstruction operations or other refractory operations) in order to attain a suitable composition for the recycling, a step of storage and recycling preparation and, finally, a step of use (for example, injection in an EAF or—with appropriate modifications and/or supplementations—as ladle slag former or addition to any other under slag process).

In the step of forced transformation, or "breakdown", by "mechanical movements of the slag mass", it is intended overturning and/or vibration and/or "grating" of the slag mass itself, carried out by means of a support grating, this being capable of overturning, vibrating and, possibly, moving the various support blades in an alternate and/or independent manner. The mechanical action, possibly accentuated by the presence of projections, cusps or other items integral with the blades or the grid composing the grating, causes the separation of the powder (which has a strong insulating effect) as well as the formation of cracks, interstices, porosity and other defects in the slag mass which ease the transfer of heat from the slag to the refrigeration fluid and/or reaction fluid. Such acceleration effect of the heat removal is further increased by the greater pushing speed of the refrigeration fluid flow sustained by the forced circulation of the same fluid and, possibly, by the development of carbonation transformations which accelerate the "breakdown" step. As is better described below, such carbonates are energetically acceptable in the method according to the present invention, because the very fine powder size obtained improves the overall energy balance, making it more tolerant to possible more stable phases.

Further object of the present invention is an apparatus for the treatment and recovery of the secondary metallurgy (LF) slag.

Further object of the present invention is a method for the recovery and recycling of residues of the steel production process to an electric arc furnace or other secondary metallurgy under slag process.

Object of the present invention is also an apparatus for the recovery and recycling of secondary metallurgy slag or residues of the steel production process to an electric arc furnace.

In particular, the apparatus for the treatment and recovery of secondary metallurgy (LF) slag, produced in a ladle furnace, comprises: at least one module which foresees at least two adjoining metallic boxes, closed and interconnectable, equipped with moveable containment partitions for the loading, unloading and transfer (possible accompanied by an overturning) of the slag; means for the support, agitation and movement of the slag, such as for example a grating formed by a grid, strip or blade structure or any other support means and possibly equipped with projections, serrations or any other means for cutting, scraping or, in any case, agitating the surface of the slag pile in order to accelerate the separation of the transformed residue, and capable of transferring and, possibly, overturning the slag pile from one box to another adjoining box; suction hoods of the breakdown powders for intercepting their finest and most volatile portion, avoiding external dispersion and permitting its recovery; apparatuses of "forced" insufflation of the cooling fluid (for example air) and/or reaction gas (for example carbon dioxide) or their mixture for accelerating the "breakdown" process; a collection system, for example with hoppers, of the breakdown products; a vibro-extractor or vibrating channel connected with the hopper to permit a control of the quantity of the material to be extracted; a screening system with mesh screen, with meshes preferably less than 10 mm, with transfer system of the dimensionally-exceeding portion to an appropriate grinding system for its reintegration in the recovery cycle; collection and transport system of the fine portion by means of one or more belts; a system of mixing with other recovery materials or pure supplementation materials, in order to optimise the composition of the powder in relation to its use; a storage plant which makes available recovered powders for subsequent operations; an insertion facility or system (for example, pneumatic injection in the EAF) of the powder as scorifying process element for the obtainment of iron and its alloys; an automation system of the apparatus capable of managing the mixture of the portions coming from the recovery of the LF slag with other recovered powders or ground portions to obtain an optimised composition formulation with respect to the application; a suction, treatment and possibly recycling facility of the fumes and dust induced by the breakdown process or by other refractory recovery processes.

In general, the method according to the invention takes place in two steps: in the first step, the bucket unloads the high temperature ladle slag into a box or storage bin in which a vibrating grating is present, along with an insufflation device of air or other cooling gas and/or chemically active gas or a mixture of the same, a collection hopper equipped with vibrating extractor and, possibly, means for the grinding and screening of the "breakdown" products. At about halfway through the cycle, the pile may be turned over to an adjoining, identical box or storage bin. The operation involves the liberation of the reaction products of the surface less exposed to the cooling gases and/or chemical reaction gases, and its forced exposure to the primary flow with consequent further improvement of the treatment speed. In particular, the turning over of the material lying on the first grating to the next, carried out at halfway through the "breakdown" process, causes a drastic renewal of the heat exchange surface and nearly complete separation of the breakdown powders present on the upper part of the mass, accumulated here during the first treatment step. Further acceleration means of the "breakdown" process consists of imparting a mechanical vibration to the slag and/or in operating a "grating" action of the surface with reciprocal motion of the section bars forming the grating, possibly equipped with cusps and blades which directly cut on the solid surface of the pile. The chemical action of the carbon dioxide, possibly added to the fluid for the forced cooling, is another means for accelerating the process. In this case, the doubling of the specific volume is exploited, of the compounds resulting from the carbonation reaction of the magnesium and calcium oxides, in any case present in the ladle slag.

Substantial advantage of the method and apparatus for the recovery and recycling of residues of the steel production process, i.e. of the slag produced by the ladle furnace and of a part of the consumed refractory materials, is therefore the obtainment of a powder very rich in calcium which may be injected inside an EAF or in any other of the under slag processes normally used in secondary metallurgy.

In particular, the advantages which derive from the employment of this innovative technology may be summarised as follows:
- reduction of the consumption of scorifiers purchased pure on the market;
- drastic reduction of the materials to be disposed in dumps;
- availability of a scorifying mixture (both for EAF and for other "Outside Furnace" treatments) of optimised composition;
- complete automation and integration of the recycling technology with the process of secondary metallurgy for the production of steel;
- greater confinement of the powders and other fines coming from the process slags and from the refractory debris material with consequent smaller environmental impact.

The structural and functional characteristics of the present invention and its advantages with regard to the prior art shall be even clearer and more evident from an examination of the following description, referred to the attached drawings wherein.

Figure 1:
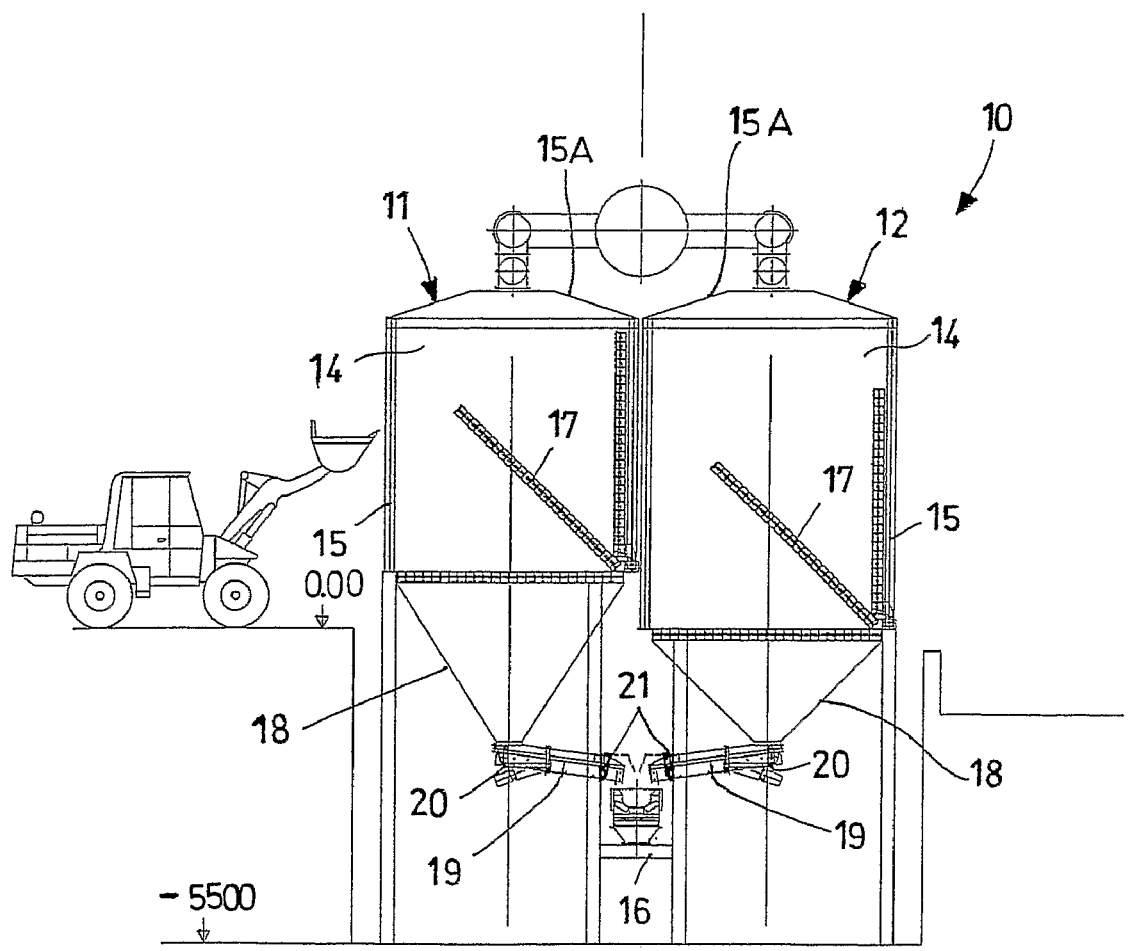
FIG. 1 is a side elevation view of an embodiment of the apparatus for the recovery of the secondary metallurgy (LF) slag according to the invention.

With reference to the drawings, in general and to FIG. 1 in particular, an embodiment of the apparatus is shown for the recovery of the secondary metallurgy (LF) slag according to the present invention, where the treatment facility of the material to be recycled 10 foresees at least two similar boxes of equal functionality 11 and 12. Two boxes 11 or 12, connected in series, constitute a standard treatment module (or module) 14, closed with moveable containment partitions 15. Each box 11 or 12 also foresees a suction hood of the powders 15A and a common conveyor belt 16 for the boxes and modules.

Inside each box 11 or 12, there are foreseen a vibrating and/or folding grating 17 connected with an underlying hopper 18, in turn connected with a vibro-extractor or vibrating channel 19.

The apparatus for the recovery of the secondary metallurgy (LF) slag according to the present invention may foresee a series of standard modules 14, whose number is related to the quantity of material which much be treated. The standard module 14 is composed of at least two closed metallic boxes 11 and 12, insulated from the outside environment by means of fixed walls and moveable containment partitions 15 which open only to permit the loading operations of the material to be treated, to overturn the slag mass from a grating in one box to a grating in an adjoining box and to overturn the metallic crust residue at the end of the treatment. The boxes 11 or 12 are moreover provided with powder suction hoods 15A, each hood 15A being equipped with appropriate butterfly valve for the adjustment of the suction during the operations of breakdown and moving of the material contained in the boxes.

The choice to equip each module 14 with at least two treatment boxes 11 and 12 was identified as an optimal solution in relation with the duration of the breakdown process. Indeed, considering that the mean breakdown time is around 24 hours and that each grating 17 permits, for example, loading 10 tons of material to be treated, every module would permit the treatment of 10 tons of material every 12 hours for a total of 20 tons/day per module. In relation with the daily production and the frequency with which the ladle slag is made available, the treatment rate may be increased by increasing the number of modules arranged in parallel and therefore halving the intervals between one loading and the next. In the specific case of the apparatus represented in FIG. 1, the use is foreseen of a treatment module composed of two boxes 11 and 12 arranged in series.

Furthermore, the presence is shown of a common conveyor belt 16 for all the modules making up the system 10, which has the task of collecting the treated material and conveying it to the successive selection and collection facility. The matting of the belt, which is equipped with containment edges in the loading zone, is for example realised in anti-heat rubber, ensuring in any case the absence of burning problems of the belt in case still-hot material falls on it.

Each metallic box 11 and 12 is equipped with a vibrating and foldable load grating 17. An interchangeable metallic grid, easily installed and removed, is placed on the grating 17.

The vibrating characteristic of the grating 17 is one of the reasons which permit the acceleration of the breakdown process, favouring the separation of already broken down material from that not yet transformed. Moreover, the possibility of turning over the material under treatment from one grating to the adjoining one permits further accelerating the process, continuously renewing the exposed surface.

The material loaded on said grating, due to the accelerated breakdown process, is transformed into powder and falls into a hopper 18, lying below the grating 17. The hopper 18 may have an anti-wear coating welded on its sloped parts. The upper part of the hopper is equipped with a series of cooling tubes, arranged offset over several rows and equipped with nozzles for the insufflation of the cooling fluid and/or reaction fluid towards the material to be treated. In the lower part of the hopper, on the other hand, there are thermocouples for the temperature control, so to avoid the exit of material at too high a temperature.

The material thus treated is extracted by means of a vibro-extractor 19, possible equipped with a closing device 21.

The thermocouples of the hopper 18 rather than controlling the gate of the hopper itself, may even act directly on the operation of the vibro-extractor or signal the warning in the control room.

Figure 2:
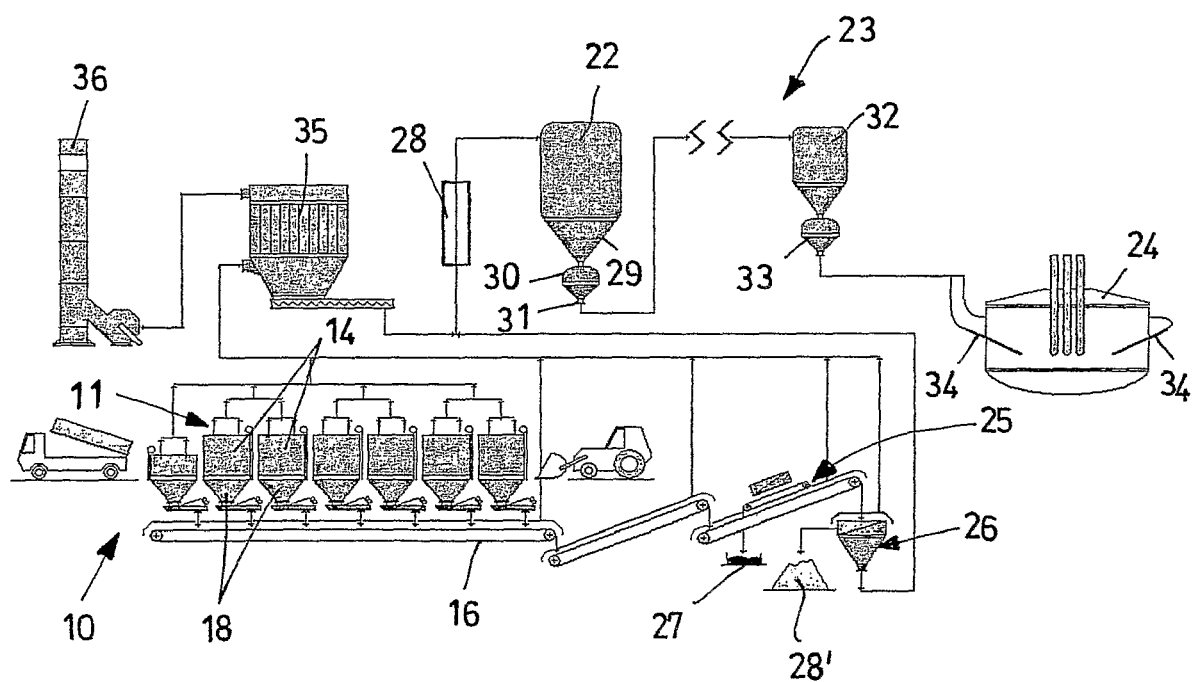
FIG. 2 is a schematic representation of an embodiment of the apparatus for the recovery and recycling of residues of the steel production process according to the present invention.
Figure 3:
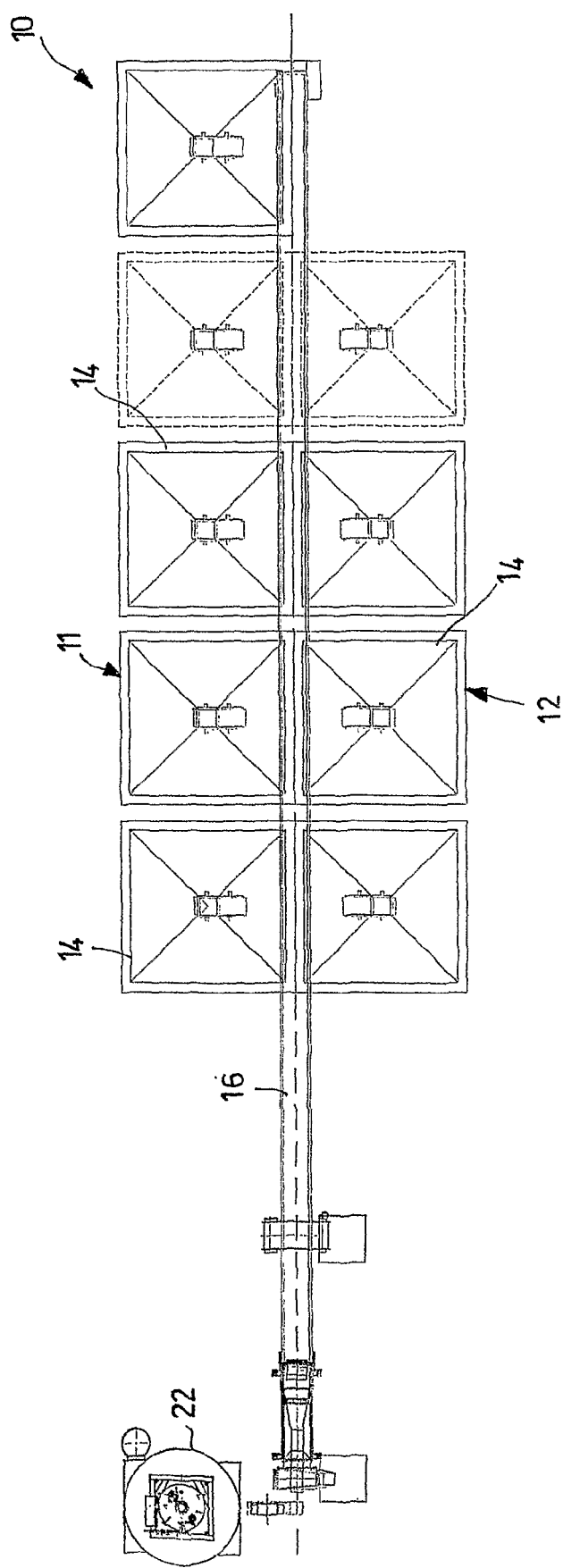
FIG. 3 is a plan view of an embodiment of the first part of the apparatus for the recovery and recycling of residues of the steel production process according to the present invention.
Figure 4:
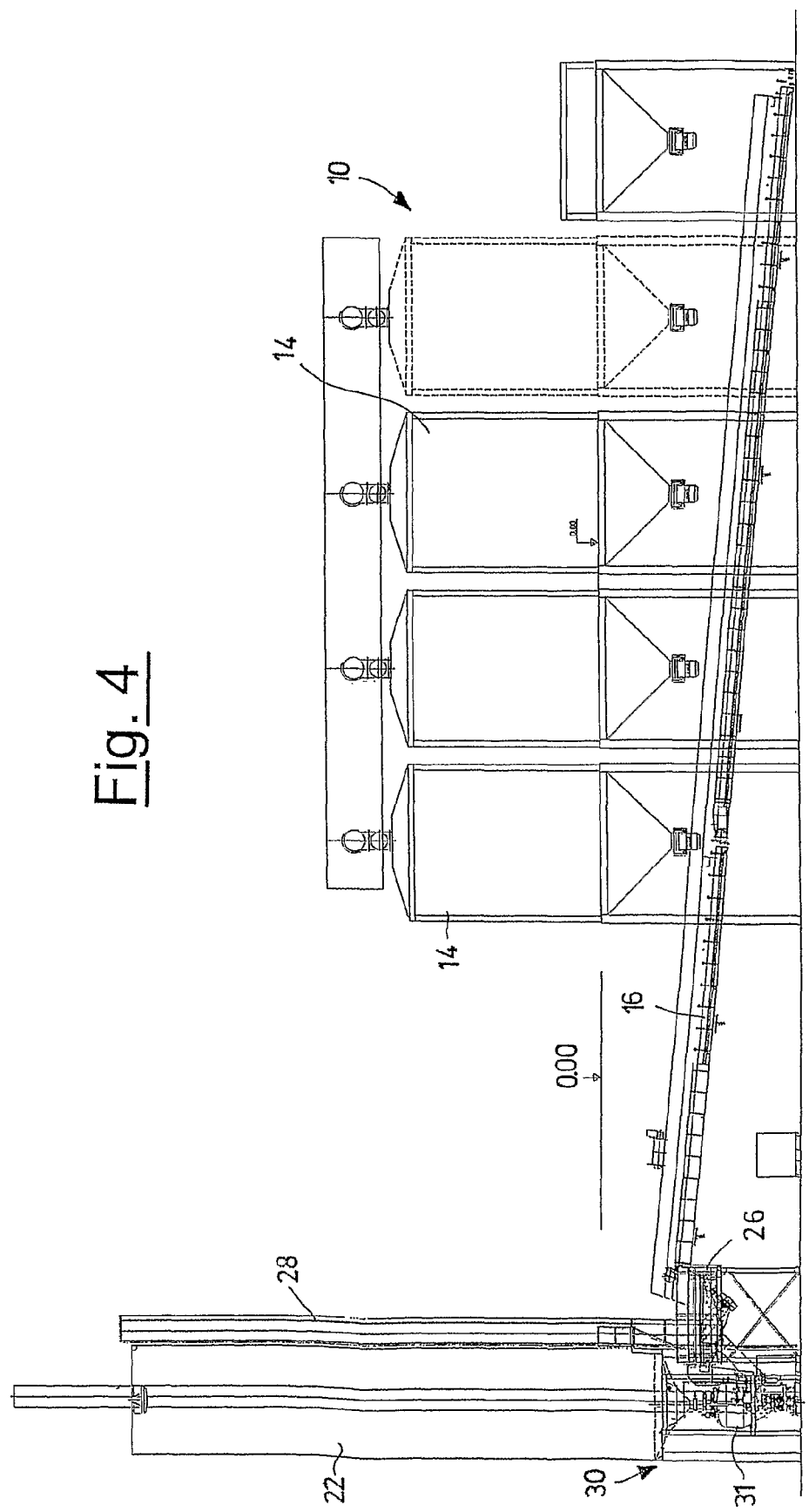
FIG. 4 is a side elevation view of an embodiment of the first part of the apparatus for the recovery and recycling of residues of the steel production process according to the present invention.

Still with reference to the drawings, in general and to FIG. 2 in particular, an embodiment of an apparatus for the recovery and recycling of residues of the steel production process is schematically shown according to the present invention, where the treatment facility of the material to be recycled 10 foresees three modules 14 with boxes 11 and 12 seen in exploded view and a belt 16 connected to the collection storage bins 22, in turn connected by means of a pneumatic system 23 to the furnace 24.

The material collected by the conveyor belt 16 coming from the boxes 11 and 12 is conveyed towards the collection storage bin 22 so that it may then be sent to the furnace system injection 23. During this path, the material is further treated so to acquire the most suitable characteristics for furnace injection. To this end, a process of deferrisation and dimensional screening is foreseen.

In FIG. 2, indeed, the deferrisation system is indicated with 25, and the screening system with 26. In the given example, the conveyor belt 16, in anti-heat rubber, is of closed type with loading hoppers 18 equipped with anti-wear coating, containment edges in the loading zone and powder suction hoods in the loading and unloading zones.

The separated ferrous material is collected in a suitable container 27 which permits its subsequent recovery. The material, before being directed to the collection storage bin 22, is selected so to have the dimensional characteristics such that it may be injected inside the furnace without creating problems for the pneumatic injection system. To attain this objective, a vibrating screen 26 is used, equipped with a screening surface with openings up to 10 mm, preferably 6 mm, equipped with a unloading hopper of the selected material onto the belt of the bucket elevator 28 (or an equivalent vertical transport system) and a separate tubing for the unloading of the over 6 mm material into a collection bin 28' so that it may be reconditioned.

In FIG. 2, to the left of the bucket elevator belt 28, a filter 35 is represented, connected to a stack 36.

The treated material which is ready to be injected into the electric furnace is stored in a suitable storage bin 22 with level probes and fluidification cone.

The treated material coming from the storage bin 22 of the collection and selection facility is injected inside the electric furnace 24 by using an adequate pneumatic injection system. In the example of FIG. 2, the transportation of material from the collection storage bin 22 to the intermediate storage bin 32 is carried out by means of launch propeller 33.

The injection of the recycling material inside the furnace 24 preferably occurs through the use of particular injectors 34 (such as for example the "KT Powder Injectors") which optimally lend themselves for the injection of different types of fines inside the EAF. In addition to having high levels of resistance to wear, ensured by a nozzle realised in steel for tools, such injectors are characterised by a particular cooling system which permits their high levels of resistance to high temperatures even in hard working conditions. The injectors, and in particular the KT Powder Injectors, are complete with flexibility sets for the powder and for the fluids, tangential filter for the cooling water and a thermocouple on the cooling fluid discharger.

In order to homogenise the injection of fines inside the furnace, the installation of at least two injectors is foreseen which may in any case function independently from each other.

The entire recovery and recycling facility of residues according to the present invention is automatically managed by an electronic control system which may be composed of two separate but integrated sections:

- the section which is involved with the management of the recovery, treatment and collection facility of the secondary metallurgy (LF) slag, controlled by means of a local switchboard inside a control room located near the facility itself;
- the section which is involved with the furnace injection system which receives digital and analog signals from the related field sensors and, controlled by a control panel present in the furnace room, regulates the injection process.

Completing the apparatus for the recovery and recycling of residues according to the present invention as above described, a fumes and dust suction and treatment facility is also present.

The scope of protection of the invention is defined by the attached claims.

In a preliminary embodiment, a mechanical shovel unloaded, through a side door of a storage bin, ladle slag at a temperature greater than 700° C. The storage bin was formed by two communicating sections, and in each of which a vibrating support grating was arranged. The speed of extraction of the lime from the ladle slag mass was increased by at least double with respect to the normal procedure. This was due to the synergetic action of the vibrating grating, which produced deep passages, incisions and roughness, as well as the cooling air, injected with the addition of carbon dioxide, by means of jets placed under the grating. It should be noted that the carbon dioxide used came from the smoke of a treatment furnace, permitting (at least theoretically) a further reduction of the environmental impact. After about 12 hours, the diving wall was opened between the two boxes and the grating completed a semi-rotary motion, unloading the overturned slag onto the adjoining grating (of identical shape to the preceding grating, even if placed at lower level). Appropriate means of mechanical retention (one step) permitted the overturning while avoiding the slipping of the slag on the subsequent grating.

Such action ensured that all the products of the phase transformation, which accumulated on the upper surface, came off, thus renewing the exposed surface. Moreover, additional cooling and carbonation sites were opened, permitting the loading (in the first box) of a new slag load. At the end of the cycle, the opening of the wall of the storage bin in communication with the outside and an overturning of the grating of the second box permitted the exiting of the residual material, which was then reinserted (possibly chopped up) in the production process in addition to the load scraps.

The underlined substantial advantage consists of realising a recycling with higher kinetics and consequently with improved efficiency. In practice, one obtains the same quantity of powder either in less time or with a smaller available area of the plant.

Furthermore, the recycling of the ladle slag to the EAF by means of powder injection permits recovering practically all of the dicalcium silicate contained in such slag ($2CaO.SiO_2$ is in fact the main constituent), without penalising the energy outputs of the furnace with regards to normal operating practice. This notwithstanding the use of a greater mass of injected material or the possible presence of many stable phases, such as magnesium and calcium carbonates, produced from the insufflation of carbon dioxide. The kinetics of the scorification process of the injected powder is in fact particularly rapid, caused by the high specific surface area ($m^2/g$) due to the mean dimensions of the particles (under one millimeter), which is finer with respect to conventional operating practice (>10 mm).

The invention claimed is:

1. Method for the recovery of the secondary metallurgy slag from a plant for the production of steel, said method comprising a cooling step of the secondary metallurgy slag, by means of the passage of air and/or other gas, a breakdown step comprising transformation of several phases present in the secondary metallurgy slag into powder, and a step of extracting the powder, wherein said breakdown step is accelerated by means of forced convection of air and/or another cooling fluid and/or another reaction gas and by means of mechanical movements of the secondary metallurgy slag that are carried out by means of overturning and vibrating support gratings of said secondary metallurgy slag, said overturning and vibrating support gratings being provided inside at least two closed adjoining metallic boxes which are connected in series and closed with movable containment partitions and which form a treatment module, and wherein said breakdown step is further accelerated by means of overturning said secondary metallurgy slag from the support grating of one of said at least two metallic boxes to the support grating of an adjoining metallic box which forms a treatment module.

2. Method according to claim 1, characterised in that the reaction gas is carbon dioxide, mixed or separately injected with the cooling fluid.

3. Method according to claim 1, characterised in being applied to ladle slag, ladle refractory, tundish refractory, or electric arc furnace refractory.

4. Method according to claim 1, characterised in that said mechanical movement of the slag mass comprises the vibration of the slag mass which occurs by means of vibration of at least one of said support gratings.

5. Method according to claim 1, characterised in that the breakdown of the slag occurs by means of vibration of at least one of said support gratings in a controlled environment and atmosphere, obtained with an insufflation of carbon dioxide.

6. Method according to claim 1, characterised in that said support grating is equipped with cusps and blades which directly cut on the solid surface of the slag mass.

7. Method according to claim 6, characterised in that said support grating is equipped with an easily substitutable wearing grid equipped with calibrated opening.

8. Method for the recovery and recycling of residues of the steel production process to an electric arc furnace or other secondary metallurgy under slag process, such method comprising a recovery step of the slag in accordance with any one of claims 1, 2, 3 and 4-7, to obtain recovered slag, a selection and collection step of the recovered slag, a step of pneumatic injection of the treated material into an electric arc oven or other secondary metallurgy under slag process.

9. Method according to claim 8, characterised in that the selection and collection step of the treated material comprises a deferrisation process and a dimensional screening process.

10. Method according to claim 9, characterised in that the deferrisation process comprises the recovery of the iron by means of a magnetic belt separator.

11. Method according to claim 9, characterised in that the dimensional screening process comprises a screening with vibrating screen with opening ranging from 0 mm to 10 mm.

12. Method according to claim 11, characterised in that the dimensional screening process comprises a screening with vibrating screen with opening 6 mm.

* * * * *